United States Patent
Jain et al.

(10) Patent No.: US 10,580,430 B2
(45) Date of Patent: Mar. 3, 2020

(54) NOISE REDUCTION USING MACHINE LEARNING

(71) Applicant: Bose Corporation, Framingham, MA (US)

(72) Inventors: Ankita D. Jain, Westborough, MA (US); Cristian Marius Hera, Lancaster, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/165,494

(22) Filed: Oct. 19, 2018

(65) Prior Publication Data

US 2019/0122689 A1    Apr. 25, 2019

Related U.S. Application Data

(60) Provisional application No. 62/574,443, filed on Oct. 19, 2017.

(51) Int. Cl.
*G10L 21/0232* (2013.01)
*G10L 21/00* (2013.01)
(Continued)

(52) U.S. Cl.
CPC .......... *G10L 21/0232* (2013.01); *G06N 3/08* (2013.01); *G10L 21/00* (2013.01);
(Continued)

(58) Field of Classification Search
CPC ............ H04N 21/6587; H04N 5/2254; H04N 5/23203; H04N 5/23216; H04N 5/23238;
(Continued)

(56) References Cited

U.S. PATENT DOCUMENTS 5,233,665 A * 8/1993 Vaughn .................. H03G 9/005
                                                                381/17
5,742,694 A * 4/1998 Eatwell .................. H04B 1/123
                                                                381/94.2
(Continued)

FOREIGN PATENT DOCUMENTS

EP        2858382       4/2015

OTHER PUBLICATIONS

International Search Report & Written Opinion; PCT/US2018/056700; dated Dec. 19, 2018; 14 pages.

*Primary Examiner* — Lun-See Lao
(74) *Attorney, Agent, or Firm* — Fish & Richardson P.C.

(57) ABSTRACT

The technology described in this document can be embodied in a method for processing an input signal that represents a signal of interest captured in the presence of noise to generate a de-noised estimate of the signal of interest. The method includes receiving an input signal representing a signal of interest captured in the presence of noise. The method also includes processing at least a portion of the input signal using a digital filter to generate a filtered signal, the digital filter configured to suppress at least a portion of spectrum of the noise. The method further includes processing the filtered signal using a first neural network to generate a de-noised estimate of the signal of interest, wherein the first neural network is trained to compensate for distortions introduced by the digital filter in the signal of interest.

19 Claims, 4 Drawing Sheets

(51) Int. Cl.
*G10L 21/0364* (2013.01)
*G06N 3/08* (2006.01)
*G10L 25/30* (2013.01)
*G10L 25/78* (2013.01)
*H04R 1/40* (2006.01)
*H04R 3/00* (2006.01)
*H04R 3/04* (2006.01)

(52) U.S. Cl.
CPC .......... *G10L 21/0364* (2013.01); *G10L 25/30* (2013.01); *G10L 25/78* (2013.01); *H04R 1/406* (2013.01); *H04R 3/005* (2013.01); *H04R 3/04* (2013.01)

(58) Field of Classification Search
CPC .... H04N 5/23296; H04N 5/247; H04N 5/332; H04N 7/181; H04R 25/507; H04R 3/005; H04R 25/405; H04R 25/407; H04R 1/406; H04R 1/46; H04R 2225/023; H04R 25/453; H04R 25/558; G03B 17/04; G03B 17/12; G03B 2205/0092; H04B 1/46; H04L 67/10

USPC ...................... 381/92, 94.1–94.5, 71.1–71.6, 381/71.11–171.14
See application file for complete search history.

(56) References Cited

U.S. PATENT DOCUMENTS

| | | | |
|---|---|---|---|
| 5,960,391 A * | 9/1999 | Tateishi | G10L 21/0272 704/202 |
| 9,390,712 B2 * | 7/2016 | Yu | G10L 15/16 |
| 9,640,194 B1 | 5/2017 | Nemala et al. | |
| 2010/0241428 A1 * | 9/2010 | Yiu | H04R 3/005 704/233 |
| 2012/0250873 A1 * | 10/2012 | Bakalos | G10K 11/178 381/71.6 |
| 2016/0071508 A1 * | 3/2016 | Wurm | G10K 11/178 381/58 |
| 2016/0322055 A1 | 11/2016 | Sainath et al. | |
| 2017/0162194 A1 | 6/2017 | Nesta et al. | |
| 2018/0061404 A1 * | 3/2018 | Devaraj | G10L 15/22 |
| 2018/0075859 A1 * | 3/2018 | Song | G10L 19/06 |
| 2018/0254040 A1 * | 9/2018 | Droppo | G10L 15/20 |

* cited by examiner

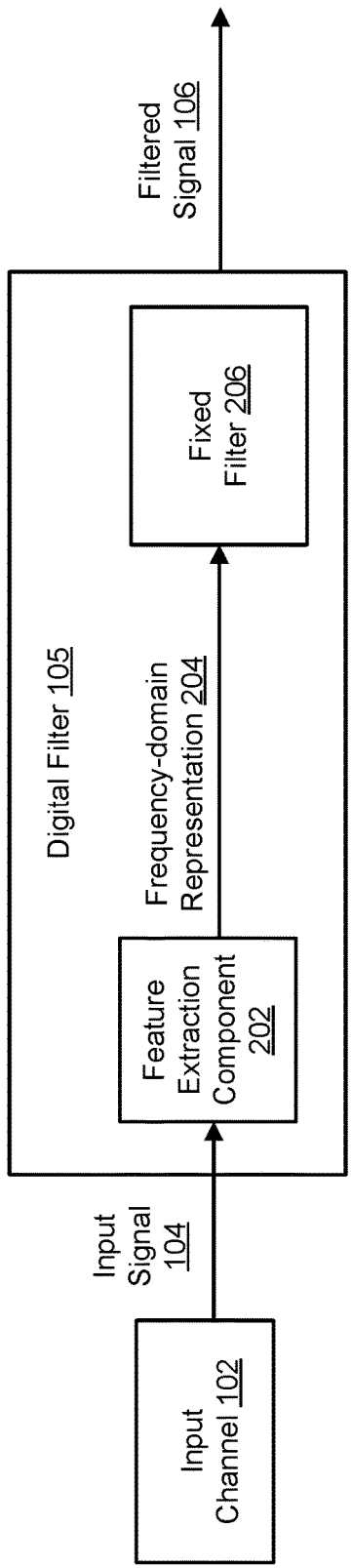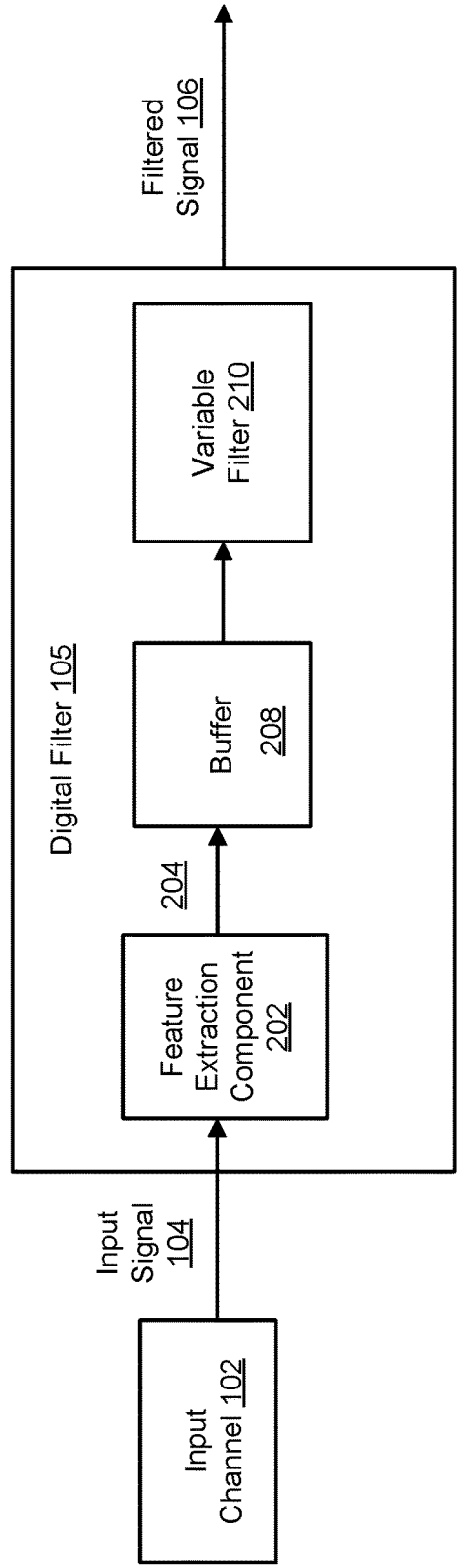

NOISE REDUCTION USING MACHINE LEARNING

CROSS-REFERENCE TO RELATED APPLICATION

This application claims priority to U.S. Provisional Application Ser. No. 62/574,443, filed on Oct. 19, 2017. The disclosure of the prior application is considered part of and is incorporated by reference in the disclosure of this application.

TECHNICAL FIELD

This disclosure generally relates to noise reduction, e.g., to overcome the effect of noise on sound reproduction in a moving vehicle.

BACKGROUND

The perceived quality of speech or music in a moving vehicle may be degraded by variable acoustic noise present in the vehicle. This noise may result from, and be dependent upon, vehicle speed, road condition, weather, and condition of the vehicle. The presence of noise may hide soft sounds of interest and lessen the intelligibility of speech or the fidelity of music.

SUMMARY

In one aspect, this document features a method for processing an input signal that represents a signal of interest captured in the presence of noise to generate a de-noised estimate of the signal of interest. The method includes receiving an input signal representing a signal of interest captured in the presence of noise. The method also includes processing at least a portion of the input signal using a digital filter to generate a filtered signal, the digital filter configured to suppress at least a portion of spectrum of the noise. The method further includes processing the filtered signal using a first neural network to generate a de-noised estimate of the signal of interest, wherein the first neural network is trained to compensate for distortions introduced by the digital filter in the signal of interest.

In another aspect, this document features a system for reducing noise from an input signal. The system includes a digital filter configured to receive an input signal representing a signal of interest captured in the presence of noise, and process at least a portion of the input signal to generate a filtered signal by suppressing at least a portion of spectrum of the noise. The system further includes a first neural network configured to process the filtered signal to generate a de-noised estimate of the signal of interest. The first neural network is trained to compensate for distortions introduced by the digital filter in the signal of interest.

In another aspect, this document features one or more machine-readable storage devices having encoded thereon computer readable instructions for causing one or more processing devices to perform various operations. The operations include receiving an input signal representing a signal of interest captured in the presence of noise. The operations further include processing at least a portion of the input signal using a digital filter to generate a filtered signal, the digital filter configured to suppress at least a portion of spectrum of the noise. The operations further include processing the filtered signal using a first neural network to generate a de-noised estimate of the signal of interest, wherein the first neural network is trained to compensate for distortions introduced by the digital filter in the signal of interest.

Implementations may include one or more of the following features.

The signal of interest can be at least one of: (i) a speech signal, or (ii) an acoustic signal representing music. The input signal can be captured using a single microphone or multiple microphones. Processing the input signal can include generating a frequency-domain representation of the signal of interest and applying the digital filter to the frequency-domain representation of the signal of interest to generate the filtered signal. The frequency-domain representation of the signal of interest can include a plurality of short-time Fourier Transform coefficients. The frequency-domain representation of the signal of interest can include complex components of coefficients representing the signal of interest. The digital filter can comprise a fixed filter configured to suppress at least a portion of the spectrum of the noise below a threshold frequency. The digital filter can comprise a variable filter, a frequency response of which is derived based on a predetermined number of frames of the input signal. The frequency response can represent an ideal ratio mask (IRM), which is computed as a square root of a ratio of (i) a measure of energy in each time-frequency bin of the signal of interest, and (ii) a measure of energy in the same time-frequency bin of the input signal. The frequency response can represent an ideal binary mask, which is equal to 0 if the corresponding IRM in the same time-frequency bin satisfies a user-defined threshold condition, and equal to a non-zero value if the corresponding IRM in the same time-frequency bin does not satisfy the user-defined threshold condition. The variable filter can include a second neural network comprising one or more neural network layers. The first neural network can include one or more neural network layers. Processing the filtered signal using the first neural network to generate a de-noised estimate of the signal of interest can include applying an inverse Fourier Transform to an output of the first neural network to generate the de-noised estimate of the signal of interest in time domain.

In some implementations, the technology described herein may provide one or more of the following advantages.

The technology described in this document uses a digital filter in combination with a machine learning model that is trained to compensate for any distortions introduced due to filtering by the digital filter. In some cases, this can improve intelligibility/clarity of the de-noised signal of interest. The presented technology can be used both when the input audio signal is recorded using a single input channel or using several input channels without any special placement requirements. The subject technology avoids the use of future contextual information for noise reduction, which in turn reduces latency of the system, and makes the technology suited for real-time applications such as phone calls. For example, the latency of the system described in this document is no more than the length of a frame of the noisy input signal, which can be very low, e.g., less than few tens of milliseconds. The special arrangement of the digital filter before the neural network in the presented technology allows for better quality of the reconstructed output signal because the neural network is trained to compensate for distortions introduced by the digital filter in the signal of interest. In addition, the machine learning model is trained using not only the magnitude of the signal of interest but also using the complex coefficients (e.g., real and imaginary components) representing the signal of interest. As a result, the presented technology is able to reconstruct not only the magnitude of the signal of interest but also its phase, thereby potentially improving the quality of the output signal (e.g., better speech intelligibility or music fidelity).

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

FIG. 2A is a block diagram of an example digital filter that may be used in the system depicted in FIG. 1.

FIG. 2B is a block diagram of another example digital filter that may be used in the system depicted in FIG. 1.

DETAILED DESCRIPTION

The technology described in this document is directed to reducing noise from an input audio signal that represents a signal of interest (e.g., music or speech) captured within a noisy environment such as a vehicle cabin. The technology mitigates the effect of noise presented in the input audio signal by suppressing a portion of spectrum of the noise using a digital filter and reconstructing the signal of interest with low distortion using a machine learning model, leading to potential improvements in the perceived quality of the de-noised output signal.

The process by which noise (e.g., that due to engine harmonics, external vehicles and windshield wipers) corrupts speech or music is inherently nonlinear and time-variant. Therefore, noise reduction methods that use only linear filters, may be ineffective to suppress such noise in the input audio signal. In addition, such filters may add distortions in the output, which in turn may reduce clarity/intelligibility of the de-noised signal. Machine learning based models such as neural networks can better suppress non-linear noise for various real-world applications, leveraging, for example, the ability to model complex non-linear systems using appropriate training corpuses. However, a noise reduction system that relies only on a machine-learning model can require complex training corpuses covering various types of noise signals, and in some cases, the resulting latency of the system may not be acceptable for some real-time applications.

The technology described in this document combines a digital filter with a machine learning model such as a neural network. The noisy signal is first pre-conditioned using the digital filter to reduce a majority of the noise in the signal. Any attendant distortion is then corrected using a machine learning based model that is trained to generate a de-noised signal in which the effects due to the distortion are compensated. The combination of the digital filter and the machine-learning based system is therefore configured to effectively suppress a portion of spectrum of the intermittent and rapidly changing noise and reconstruct the signal of interest with high quality.

Figure 1:
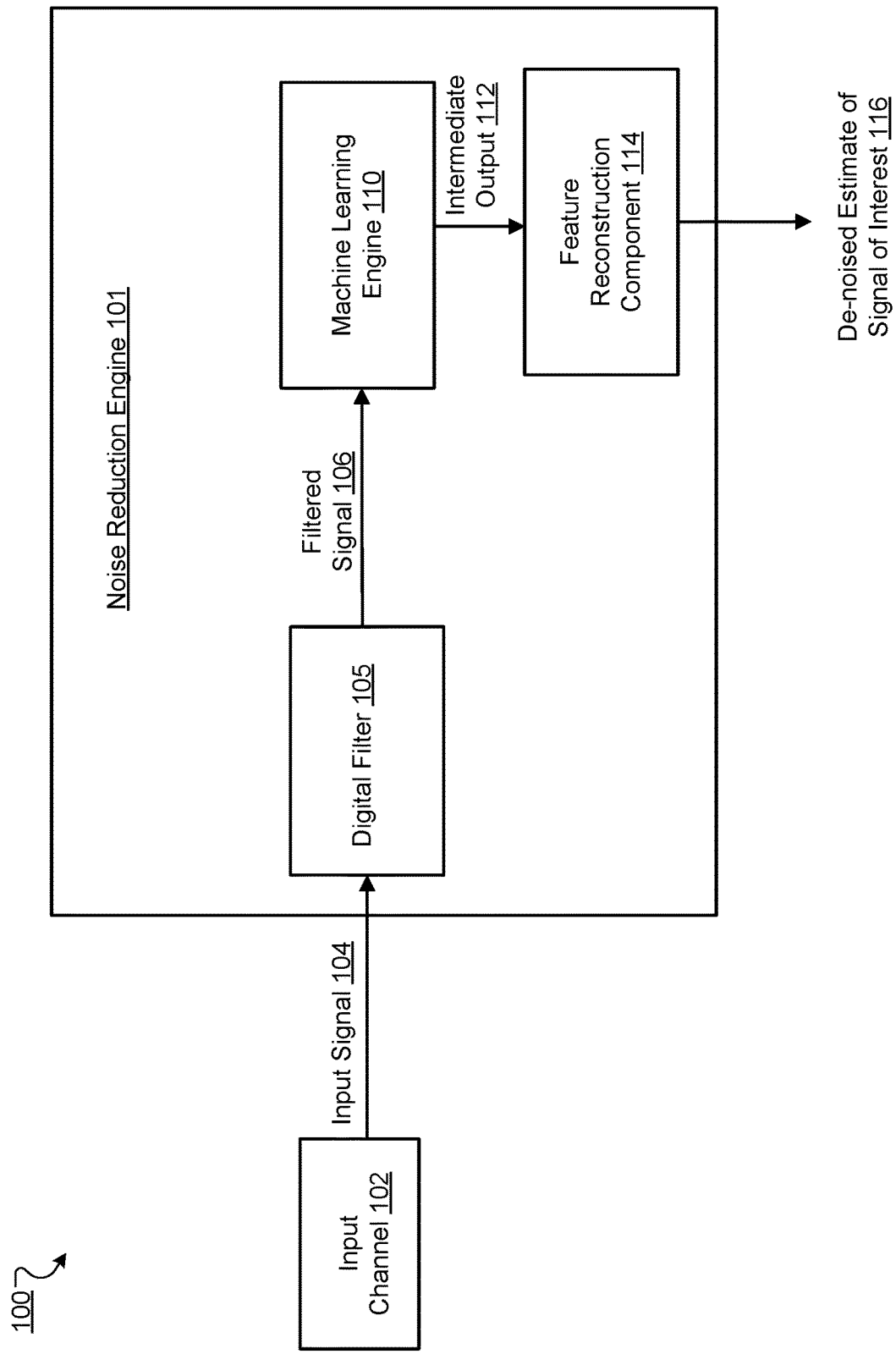
FIG. 1 is a block diagram of an example noise reduction system for processing an input signal to generate a de-noised estimate of a signal of interest.
Figure 3:
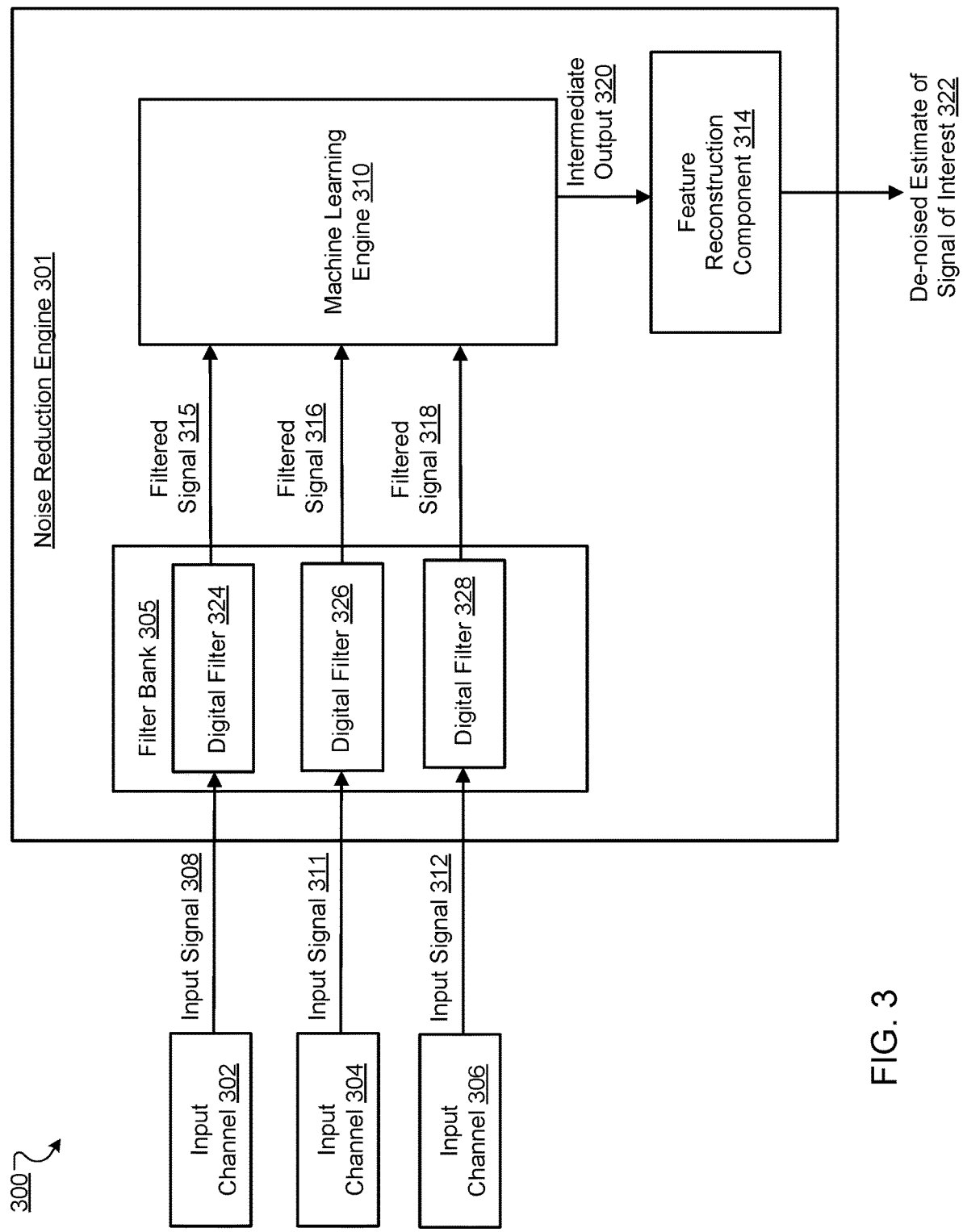
FIG. 3 is a block diagram of an example noise reduction system for processing a combined input signal that includes multiple input signals received from multiple input channels to generate a de-noised estimate of a signal of interest.

FIG. 1 is a block diagram of an example noise reduction system 100 for processing an input signal 104 to generate a de-noised estimate of a signal of interest. The noise reduction system 100 can include a noise reduction engine 101 configured to receive an input signal 104 from one or more input channels, for example, one or more microphones. While FIG. 1 shows a single input channel 102, in some implementations, the noise reduction engine 101 can receive a combined input signal that includes multiple input signals from multiple input channels as shown in FIG. 3. The input signal 104 represents a signal of interest captured in the presence of noise. In some cases, the signal of interest is a speech signal produced by a driver or a passenger inside a vehicle. In some other cases, the signal of interest is an acoustic signal representing music produced by an audio system of the vehicle or by a device placed inside the vehicle. The input signal 104 is captured in the presence of noise, for example, in-cabin noise that originates from one or more sources such as engine harmonics, cabin vibrations, road, tire cavity resonance, external vehicles, rain, or windshield wipers.

The noise reduction engine 101 can include a digital filter 105, a machine learning engine 110, and a feature reconstruction component 114. The digital filter can be implemented, for example, using one or more processing devices such as a digital signal processor (DSP). The digital filter 105 is configured to process the input signal 104 to generate a filtered signal 106. In some implementations, this can include generating a frequency-domain representation of the signal of interest, and applying a transfer function of the digital filter to the frequency-domain representation of the signal of interest to generate the filtered signal.

In some implementations, the digital filter 105 is a fixed filter configured to suppress at least a portion of the spectrum of the noise below a threshold frequency. For example, the digital filter 105 can be a high pass filter having a cutoff frequency that is selected based on spectral content of predominant noise found in car cabins. In some implementations, the digital filter 105 is a variable filter, a frequency response of which is derived based on a predetermined number of frames of the input signal. In some cases, the frequency response can represent an ideal ratio mask (IRM), which is computed as a square root of a ratio of (i) a measure of energy in each time-frequency bin of the signal of interest, and (ii) a measure of energy in the same time-frequency bin of the input signal. In some other cases, the frequency response can represent an ideal binary mask, which is equal to 0 if the corresponding IRM in the same time-frequency bin satisfies a user-defined threshold condition, and equal to a non-zero value if the corresponding IRM in the same time-frequency bin does not satisfy the user-defined threshold condition. Processing the input signal 104 to generate the filtered signal 106 using the digital filter 105 is described in more detail below with reference to FIGS. 2A and 2B.

Continuing to refer to FIG. 1, the machine learning engine 110 is configured to receive as input the filtered signal 106, and process the filtered signal 106 to generate an intermediate output 112. The machine learning engine 110 can include one or more processing devices that implement a machine learning model trained to compensate for any distortions introduced by the digital filter 105 in the signal of interest. For example, the machine learning model can be a neural network that includes one or more neural network layers, for example, an input layer and an output layer with hidden layers in between, each including several units of neurons. The one or more neural network layers can include, for example, an activation neural network layer, a convolutional neural network layer, or other type of neural network layer. The neural network can be trained, by using an unsupervised or supervised training technique, to reconstruct de-noised audio signals in which any distortions introduced by the digital filter 105 are compensated.

The feature reconstruction component 114 is configured to receive the intermediate output 112 from the machine learning engine 110, and process the intermediate output 112 to generate the de-noised estimate of signal of interest 116. In some implementations, the feature reconstruction component 114 can include one or more processing devices that are configured to apply an inverse Fourier Transform to the intermediate output 112 to generate the de-noised estimate of the signal of interest 116 in the time domain.

In some implementations, the machine learning engine 110 can be used to implement a neural network, which is trained to reconstruct audio signal information (e.g., low signal to noise ratio (SNR) speech) that is lost/distorted in denoising the noisy input signal using the digital filter 105. In the case of speech signals, the reconstruction is aided by the highly harmonic nature of speech up to approximately 2000 Hz. For example, because most vehicle cabin noise falls within frequencies less than 500 Hz, the neural network can use relatively higher SNR harmonic speech content between roughly 500-2000 Hz to re-generate any missing harmonics below 500 Hz. This reconstruction, if not performed, results in highly distorted speech even for a perfectly identified ratio mask. Such distortion is not desirable in applications that involve a far end human listener or an automated speech recognition (ASR) engine, which is typically trained on undistorted speech.

The use of the machine learning engine 110 also has other significant advantages in addition to noise reduction. Speech typically transferred via telephone lines is high pass filtered below 300 Hz. The performance of ASR drops considerably from full band speech to speech that is cutoff below 300 Hz. The machine learning engine 110, applied to clean speech only, is then able to reconstruct speech content or extend its bandwidth below 300 Hz well. The reconstruction not only makes the full band estimate sound more natural and tonally balanced, but also has a quantifiable improvement in ASR performance, bringing it close to the ASR performance of original full band speech.

FIG. 2A is a block diagram of an example digital filter 105 that may be used in the system 100 depicted in FIG. 1. As shown in the example of FIG. 2A, the digital filter 105 can include a feature extraction component 202 and a fixed filter 206. The feature extraction component 202 is configured to receive an input signal 104 from an input channel 102. As discussed above, the input signal 104 represents a signal of interest captured in the presence of noise. In some cases, the signal of interest is a speech signal produced by a driver or a passenger inside a vehicle. In some other cases, the signal of interest is an acoustic signal representing music produced by an audio system of the vehicle or by a device placed inside the vehicle. The feature extraction component 202 is configured to transform the input signal 104 in time domain to a frequency domain representation 204. For example, representing the time domain input signal 104 as $x[k]_m$, where m is the frame of length τ, and k is the frequency bin index, k=0, 1, 2, . . . , N−1, the feature extraction component 202 converts the time domain input signal 104 to the frequency-domain representation 204 that has a form of short-time Fourier Transform (STFT) coefficients X[m, k] as follows:

$$X[m,k]=\Sigma_{n=0}^{N-1}x[n]_m w[\tau-n]e^{-j2\pi kn/N} \quad (1)$$

where w[n] is a window function, for example, a Hanning or Cosine function. $e^{-j2\pi kn/N}$ can be decomposed into complex components (i.e., real and imaginary components) of the STFT coefficients X[m, k] that represents the signal of interest.

The fixed filter 206 is configured to process the frequency-domain representation 204 to generate the filtered signal 106.

In particular, the fixed filter 206 is fixed filter configured to suppress at least a portion of the spectrum of the noise below a threshold frequency.

Specifically, the fixed filter can be a fixed high pass filter with a cutoff frequency $f_0$ to filter out a portion of the input signal 104 that has a frequency lower than the cutoff frequency. The cutoff frequency $f_0$ can be selected, for example, based on spectral content of predominant noise found in car cabins. For example, to optimize the balance of noise reduction and distortions in car cabins, the cutoff frequency can be set in a range of 200-400 Hz.

Given the frequency-domain representation 204 denoted by X[m, k], the fixed high pass filter, denoted as H[k, m], can generate the filtered signal 106 that has the following form:

$$\tilde{X}[m,k]=X[m,k]H[k,m] \quad (2)$$

In some implementations, the fixed high pass filter H[k, m] can be a binary time frequency mask that remains constant cross time, given by $$H[k,m] = \begin{cases} 0 & \text{for } k < Nf_o/f_s \\ 1 & \text{for } k \geq Nf_o/f_s \end{cases} \text{ for all } m \quad (3)$$

where $f_s$ is a data sampling frequency.

FIG. 2B is a block diagram of another example digital filter 105 that may be used in the system depicted in FIG. 1. The feature extraction component 202 is substantially similar to that described with reference to FIG. 2A. The digital filter 105, in some implementations, includes a buffer 208. The buffer 208 is a memory configured to store frequency domain representations of input signals, e.g., the frequency domain representation 204 of the input signal 104.

The digital filter 105 includes a variable filter 210, a frequency response of which is derived based on a predetermined number of frames of the input signal. The variable filter can include a neural network that includes one or more neural network layers.

In some cases, the frequency response can represent an ideal ratio mask (IRM). The ideal ratio mask IRM [m, k] for a given time frequency bin k in a given frame m can be computed using the following equation:

$$IRM[m, k] = \sqrt{\frac{S[m, k]^2}{S[m, k]^2 + N[m, k]^2}}. \quad (4)$$

where $S[m, k]^2$ is a measure of energy in time-frequency bin k in frame m of the signal of interest, and $S[m, k]^2+N[m, k]^2$ is a measure of energy in the same time-frequency bin of the input signal, assuming independence between the signal of interest and noise, which is typically the case The variable filter can include a neural network that includes one or more neural network layers. To estimate the IRM for a given time frequency bin k in a given frame m, the neural network obtains as input N previous frames from the buffer 208. The neural network is trained to generate an estimate of a mean IRM[m, k], denoted as $\overline{IRM}$ [m, k], across those N frames.

The filtered signal 106 for the time frequency bin k in the frame m can then be computed as follows:

$$\tilde{X}[m,k] = X[m,k] \overline{IRM}[m,k]$$

The use of the variable filter to derive ideal ratio mask can provide the following advantages. First, ideal ratio mask can identify regions of no signal of interest (e.g., speech signal or acoustic signal representing music) and all noise, such as pauses between words, fairly well and deemphasizes those regions to gain greater noise reduction. Second, ideal ratio mask deemphasizes regions of low signal to noise ratio (SNR), thereby forcing the machine learning engine following the digital filter 105 to use higher frequency, high SNR speech content to extrapolate speech content in these low frequencies. The combined effects of these two phenomena results in a better noise reduction performance and more tonally balanced reconstructed speech/acoustic signal.

In some other cases, the frequency response can represent an ideal binary mask (IBM) that is equal to 0 if the corresponding IRM in the same time-frequency bin satisfies a user-defined threshold condition, and equal to a non-zero value if the corresponding IRM in the same time-frequency bin does not satisfy the user-defined threshold condition. For example, the ideal binary mask IBM[m, k] for a given time frequency bin k in a given frame m can be defined as follows:

$$IBM[m,k] = \begin{cases} 0 & \text{if } IRM[m,k] < \alpha \\ 1 & \text{if } IRM[m,k] > \alpha \end{cases} \quad (5)$$

That means, the IBM[m, k] is equal to 0 if it is less than a user-defined threshold $\alpha$, and equal to a non-zero value such as 1 if it is greater than the user-defined threshold $\alpha$.

FIG. 3 is a block diagram of an example noise reduction system 300 for processing a combined input signal that includes multiple input signals received from multiple input channels to generate a de-noised estimate of a signal of interest.

Generally, the noise reduction system 300 includes a noise reduction engine 301 configured to receive an input signal that is a combination of multiple signals received from multiple input channels. The multiple input channels can be multiple microphones. The noise reduction engine 301 is configured to process the input signal to generate a de-noised estimate of signal of interest 322.

In particular, the noise reduction engine 301 includes a filter bank 305 that has one or more digital filters. In some implementations, the filter bank 305 can use different digital filters for different input channels. For example, as shown in FIG. 3, the filter bank 305 has (i) digital filter 324 configured to process input signal 308 received from input channel 302 to generate a filtered signal 315, (ii) digital filter 326 configured to process input signal 311 received from input channel 304 to generate a filtered signal 316, and (iii) digital filter 328 configured to process input signal 312 received from input channel 306 to generate a filtered signal 318. In some other implementations, the number of digital filters in the filter bank 305 can be less than the number of input channels. For example, the filter bank 305 can use a digital filter for two or more input channels.

Each input signal includes a clean signal component in time domain and a noise signal component in time domain. The clean signal component represents a portion of the signal of interest, for example, a speech signal or an acoustic signal representing music. Each digital filter is configured to suppress at least a portion of spectrum of the noise in a respective input signal received from a respective input channel by generating a frequency-domain representation of the signal of interest, and by applying an adaptive filter to the frequency-domain representation of the signal of interest to generate a respective filtered signal. The process for generating a filtered signal from an input signal is described in detail above with reference to FIGS. 2A and 2B.

After the filtered signals for the input signals are generated, the machine learning engine 310 is configured to process the filtered signals to generate an intermediate output 320. The machine learning engine 310 implements a machine learning model that is trained to compensate for distortions introduced by the digital filters in the signal of interest. The machine learning model can be a neural network that includes one or more neural network layers, for example, an input layer and an output layer with hidden layers in between, each including several units of neurons. The one or more neural network layers can include, for example, an activation neural network layer, a convolutional neural network layer, or other type of neural network layer. The neural network can be trained, by using an unsupervised or supervised training technique, to reconstruct audio signal information that has been lost in the low signal to noise ratio (SNR) regions of the noisy input signals in order to compensate for distortions introduced by the digital filters in the filter bank 305.

The feature reconstruction component 314 is configured to receive the intermediate output 320 from the machine learning engine 310 and to process the intermediate output 320 to generate the de-noised estimate of signal of interest 322. In particular, the feature reconstruction component 314 can include one or more processing devices that are configured to apply an inverse Fourier Transform to the intermediate output 320 to generate the de-noised estimate of the signal of interest 322 in time domain.

Figure 4:
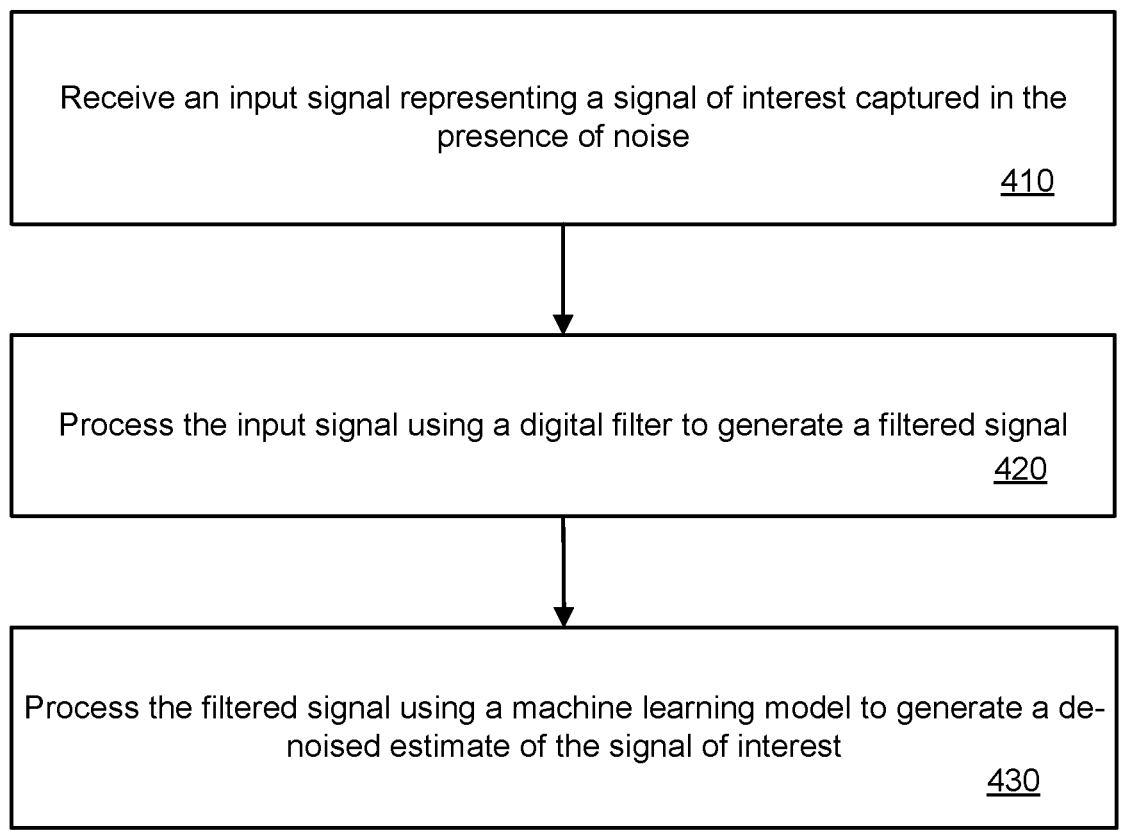
FIG. 4 is a flow chart of an example process for processing an input signal to generate a de-noised estimate of a signal of interest.

FIG. 4 is a flow chart of an example process for processing an input signal to generate a de-noised estimate of a signal of interest in accordance with the technology described herein. In some implementations, the operations of the process 400 can be executed, at least in part, by the noise reduction engine 101 or the noise reduction engine 301 described above. Operations of the process 400 includes receiving an input signal (410). The input system can be received from one or more input channels, for example, one or more microphones. The input signal represents a signal of interest captured in the presence of noise. In some cases, the signal of interest is a speech signal produced by a driver or a passenger inside a vehicle. In some other cases, the signal of interest is an acoustic signal representing music produced by an audio system of the vehicle or by a device placed inside the vehicle. The input signal is captured in the presence of noise, for example, in-cabin noise that originates from one or more sources such as engine harmonics, cabin vibrations, road, tire cavity resonance, external vehicles, rain, or windshield wipers.

Operations of the process 400 can also include processing the input signal using a digital filter to generate a filtered signal (420). This can include using the digital filter to suppress at least a portion of spectrum of the noise. In some implementations, this can include generating a frequency-domain representation of the signal of interest, and applying a transfer function of the digital filter to the frequency-domain representation of the signal of interest to generate the filtered signal. In some implementations, the digital filter is a fixed filter configured to suppress at least a portion of the spectrum of the noise below a threshold frequency. For example, the digital filter 105 can be a high pass filter having a cutoff frequency that is selected based on spectral content of predominant noise found in car cabins. In some implementations, the digital filter is a variable filter, a frequency response of which is derived based on a predetermined number of frames of the input signal. In some cases, the frequency response can represent an ideal ratio mask (IRM), which is computed as a square root of a ratio of (i) a measure of energy in each time-frequency bin of the signal of interest, and (ii) a measure of energy in the same time-frequency bin of the input signal. In some other cases, the frequency response can represent an ideal binary mask, which is equal to 0 if the corresponding IRM in the same time-frequency bin satisfies a user-defined threshold condition, and equal to a non-zero value if the corresponding IRM in the same time-frequency bin does not satisfy the user-defined threshold condition. Processing the input signal to generate the filtered signal using the digital filter is described in more detail above with reference to FIG. 2.

Operations of the process 400 includes processing the filtered signal using a machine learning engine to generate a de-noised estimate of the signal of interest (430). The machine learning engine can include one or more processing devices that implement a machine learning model trained to compensate for any distortions introduced by the digital filter in the signal of interest. The machine learning engine can be a neural network that includes one or more neural network layers, for example, an input layer and an output layer with hidden layers in between, each including several units of neurons. The one or more neural network layers can include, for example, an activation neural network layer, a convolutional neural network layer, or other type of neural network layer. The neural network can be trained, by using an unsupervised or supervised training technique, to reconstruct de-noised audio signals in which any distortions introduced by the digital filter are compensated.

As described in detail below, the technology described in this document can be used in other applications beyond car cabin noise reduction. To make the technology applicable to each of these applications, the training dataset used to train the machine learning model can be altered to best reflect the requirements of each application.

a. Speech Bandwidth Extension for Landline Telephone Calls for Clean or Noisy Speech:

Most calls to landline phones have a high pass filter above 300 Hz in place to remove low frequency noise. However, such filtering significantly shifts the tonal balance of natural voice and degrades automated speech recognition (ASR) performance of engines that are typically trained on full band speech. The technology described in this document uses a machine learning model such as a neural network that works on high pass filtered noisy speech, but with no noise or infinite SNR. Therefore, the subject technology can enable reconstruction of speech below 300 Hz, thereby restoring the tonal balance of speech to a very good degree and significantly improving ASR performance of the reconstructed or bandwidth extended speech. The subject technology therefore can be applied in partially or fully automated telephonic services that are provided via landline transmission, for example, in banks, hospitals, or credit card services.

b. Noise Reduction for Hearing Aids:

The subject technology can be applied in noise reduction for hearing aids as the hearing aid industry is also faced by similar challenges as those faced in the car cabin noise reduction application, for example, low latency requirement, minimal speech distortion, and high noise reduction performance under very low SNRs.

c. Noise Reduction for any Systems that Enable Real Time Communication Between Groups of People:

The subject technology can be applied to headphones or earphones used to receive and make phone calls, and in speaker systems used to receive calls. The advantage of applying the subject technology is that the noise reduction engine described in this document can be dropped as a module either at the transmitting end or receiving end of noisy speech. Further, the presented technology can be used when the input audio signal is recorded using a single input channel (for example, a single microphone). The advantage of using a single microphone, in this particular application, is significant when considering the limited of physical space on some of these systems to mount either DSP or sensing hardware.

d. Modified Input to Train an ASR Service:

Most ASR engines try to directly recognize speech from noisy mixes. Instead of starting from scratch, the output of the noise reduction engine described herein can be used as a modified input to train an ASR neural network. This can yield better ASR results since the estimate of clean speech using the presented technology has a much better ASR performance to begin with compared to noisy speech.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable digital processor, a digital computer, or multiple digital processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can be implemented as an apparatus, method, or electronic system that may include one or more processing devices and memory to store executable instructions to perform the operations described in this specification.

While this specification contains many specific implementation details, these should not be construed as limitations on the scope of any claims or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving an input signal representing a signal of interest captured in the presence of noise, wherein the signal of interest is at least one of (i) a speech signal or (ii) an acoustic signal representing music;
    processing at least a portion of the input signal using a digital filter to generate a filtered signal, the digital filter being configured to suppress at least a portion of spectrum of the noise; and
    processing the filtered signal using a first neural network to generate a de-noised estimate of the signal of interest, wherein the first neural network is trained to compensate for distortions introduced by the digital filter in the signal of interest,
    wherein the digital filter is at least one of a fixed filter or a variable filter.

2. The method of claim 1, wherein the input signal is captured using one or more microphones.

3. The method of claim 1, wherein processing the input signal comprises:
    generating a frequency-domain representation of the signal of interest; and applying the digital filter to the frequency-domain representation of the signal of interest to generate the filtered signal.

4. The method of claim 3, wherein the frequency-domain representation of the signal of interest comprises a plurality of short-time Fourier Transform coefficients.

5. The method of claim 3, wherein the frequency-domain representation of the signal of interest comprises complex components of coefficients representing the signal of interest.

6. The method of claim 1, wherein the digital filter is a fixed filter configured to suppress at least a portion of the spectrum of the noise below a threshold frequency.

7. The method of claim 1, wherein the digital filter comprises a variable filter, a frequency response of which is derived based on a predetermined number of frames of the input signal.

8. The method of claim 7, wherein the frequency response represents an ideal ratio mask (IRM), which is computed as a square root of a ratio of (i) a measure of energy in each time-frequency bin of the signal of interest, and (ii) a measure of energy in the same time-frequency bin of the input signal.

9. The method of claim 7, wherein the frequency response represents an ideal binary mask, which is equal to 0 if the corresponding IRM in the same time-frequency bin satisfies a user-defined threshold condition, and equal to a non-zero value if the corresponding IRM in the same time-frequency bin does not satisfy the user-defined threshold condition.

10. The method of claim 7, wherein the variable filter comprises a second neural network comprising one or more neural network layers.

11. The method of claim 1, wherein processing the filtered signal using the first neural network to generate a de-noised estimate of the signal of interest comprises:
applying an inverse Fourier Transform to an output of the first neural network to generate the de-noised estimate of the signal of interest in time domain.

12. A system for reducing noise from an input signal comprising:
a digital filter configured to:
receive an input signal representing a signal of interest captured in the presence of noise, wherein the signal of interest is at least one of (i) a speech signal or (ii) an acoustic signal representing music, and
process at least a portion of the input signal using the digital filter to generate a filtered signal by suppressing at least a portion of spectrum of the noise wherein the digital filter is at least one of a fixed filter or a variable filter; and
a first neural network configured to:
process the filtered signal to generate a de-noised estimate of the signal of interest,
wherein the first neural network is trained to compensate for distortions introduced by the digital filter in the signal of interest.

13. The system of claim 12, wherein processing the input signal comprises:
generating a frequency-domain representation of the signal of interest; and
filtering the frequency-domain representation of the signal of interest using the digital filter to generate the filtered signal.

14. The system of claim 12, wherein the digital filter is a fixed filter configured to suppress at least a portion of the spectrum of the noise below a threshold frequency.

15. The system of claim 12, wherein the digital filter comprises a variable filter, a frequency response of which is derived based on a predetermined number of frames of the input signal.

16. The system of claim 15, wherein the frequency response represents an ideal ratio mask (IRM), which is computed as a square root of a ratio of (i) a measure of energy in each time-frequency bin of the signal of interest, and (ii) a measure of energy in the same time-frequency bin of the input signal.

17. The system of claim 15, wherein the frequency response represents an ideal binary mask, which is equal to 0 if the corresponding IRM in the same time-frequency bin satisfies a user-defined threshold condition, and equal to a non-zero value if the corresponding IRM in the same time-frequency bin does not satisfy the user-defined threshold condition.

18. The system of claim 12, wherein processing the filtered signal using the first neural network to generate a de-noised estimate of the signal of interest comprises:
applying an inverse Fourier Transform to an output of the first neural network to generate the de-noised estimate of the signal of interest in time domain.

19. One or more machine-readable storage devices having encoded thereon computer readable instructions for causing one or more processing devices to perform operations comprising:
receiving an input signal representing a signal of interest captured in the presence of noise, wherein the signal of interest is at least one of (i) a speech signal or (ii) an acoustic signal representing music;
processing at least a portion of the input signal using a digital filter to generate a filtered signal, wherein the digital filter is configured to suppress at least a portion of spectrum of the noise, and wherein the digital filter is at least one of a fixed filter or a variable filter; and
processing the filtered signal using a first neural network to generate a de-noised estimate of the signal of interest, wherein the first neural network is trained to compensate for distortions introduced by the digital filter in the signal of interest.

* * * * *